H. E. GOLDBERG.
CALCULATING MACHINE.
APPLICATION FILED AUG. 19, 1911.
1,076,110.
Patented Oct. 21, 1913.
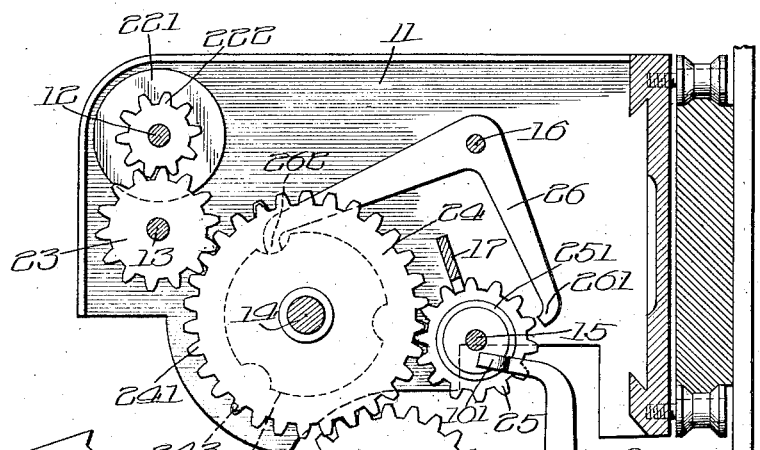
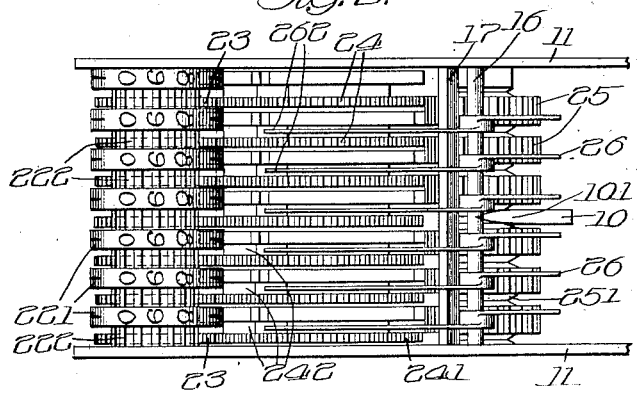
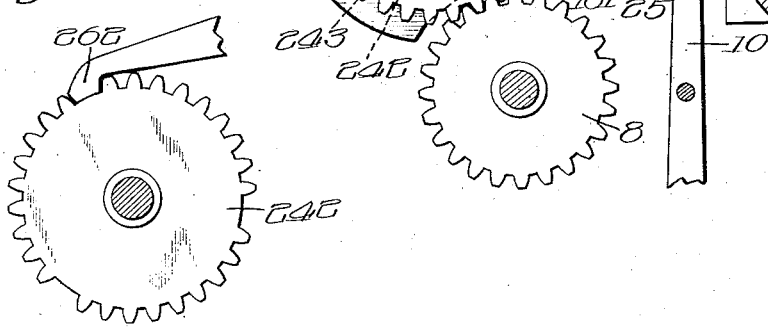
Witnesses:
Jno. H. Nelson Jr.
Edwin B Nelson
Inventor:
Hyman Eli Goldberg

UNITED STATES PATENT OFFICE.

HYMAN ELI GOLDBERG, OF CHICAGO, ILLINOIS, ASSIGNOR TO GOLDBERG CALCULATING MACHINE CO., OF CHICAGO, ILLINOIS.

CALCULATING-MACHINE.

1,076,110.  Specification of Letters Patent.  Patented Oct. 21, 1913.

Application filed August 19, 1911. Serial No. 644,970.

*To all whom it may concern:*

Be it known that I, HYMAN ELI GOLDBERG, a citizen of the United States, residing at Chicago, in the county of Cook and State of Illinois, have invented a certain new and useful Improvement in Calculating-Machines, of which the following is a specification.

The object of my invention is an improved totalizer, adapted to be used in a manner similar to the totalizer shown in Patent No. 893,719, issued to John C. Wahl, July 21, 1908.

The main object of my invention is a totalizer which calculates for both addition and subtraction, and which contains its parts rigidly supported, and is of easy and cheap manufacture.

The mechanism is illustrated in the drawings, of which—

Figure 1 shows an end elevation and Fig. 2 a plan view of the totalizer. Fig. 3 shows a modification.

As thoroughly described in the above cited patent, the totalizer is mounted upon the carriage of a typewriter and travels therewith during the letter space advance thereof. Mounted upon the framework of the typewriter is the master mechanism, which is operated by the figure keys of the typewriter. This master mechanism includes the master wheel and the master dog. The operation of the figure keys of the typewriter produces a rotation in the master wheel, which rotation is transmitted into the carrier wheels of the totalizer. The master dog serves to operate the parts of the totalizer, particularly to disconnect the carrier wheel of the totalizer which is being operated by the master wheel from the next lower carrier wheel,—that is, the carrier wheel to the right. More in detail, the operation of the parts is timed as follows: At the beginning of the depression of a figure key the master mechanism operates the master dog. Meanwhile, the master wheel has been held stationary. The continuation of the depression of the figure key brings the master dog to rest and then begins the rotation of the master wheel, thus rotating the carrier wheel engaged thereby. The master wheel is then brought to rest and locked in position, and after such bringing to rest, the master dog is retracted to its prior or normal position. All these movements occur during the down stroke of the figure key. Upon the upstroke of the key the typewriter carriage and totalizer move one step to the left, moving the carrier wheel which is in engagement with the master wheel out of engagement therewith and bringing the carrier wheel immediately to the right into engagement therewith. This completes the cycle of operations. This has been thoroughly described in great detail in the above cited patent and reference is made to it for a more extended description of the parts.

Referring now to the drawings, 8 represents the master wheel and 10 the master dog. The normal condition of the master dog is with its upper end to the back, that is, with the upper end to the right, looking at Fig. 1. The totalizer is composed of the side walls 11, 11, which support the numeral wheel shaft 12, the intermediate wheel shaft 13, the carrier wheel shaft 14, the carried pinion shaft 15, the pawl shaft 16 and the locking plate 17, which serve to support the parts, and also to bind the walls together. The numeral wheels 22 are each constructed of a figured cylinder 221 and a gear 222 to drive it, as is usual in the art. The intermediate wheels 23 are each a plain spur gear, which serves as an idle gear between the numeral wheel 22 and its carrier wheel 24. Each carrier wheel 24 is composed of a thirty-toothed disk 241 at the right, a three-scalloped disk 242 at the middle and a three-toothed disk 243 at the left. All three disks are rigidly fastened together. The thirty-toothed disk 241 has two functions, namely: (1) to be engaged and driven by the master wheel 8, as above explained, and (2) to be engaged and driven by the carried pinion 25, as will be explained below. The three-scalloped disk 242 has one function, namely, to lock the pawl 26 at all times except during the period of "carrying". The three-toothed gear 243 has one function, namely, to drive the carried pinion 25 during the "carrying". Each carried pinion 25 is a plain spur gear with its hubs 251 somewhat beveled. Its functions are: First, it is an intermediate pinion between one carrier wheel and the next carrier wheel to the left, for the purpose of "carrying" tens, as is well known in the art. Second, it serves as a lockable member to be locked by the pawl 26 to prevent the overthrow in "carrying". Third, it also serves as a lockable member in another manner to be locked by the lock plate 17 to help to keep the parts alined. Each pawl 26 is composed of two parts, 261 and 262. The function of 261 is to lock the coöperating carried pinion 25, which is so locked whenever the pawl end 261 is squeezed in between the teeth of the pinion. Again, reversely, if the pinion be rotated the pawl end 261 is forced away from said pinion and the pawl end 262 is therefore forced toward and into the three-scalloped disk 242. Should a carrier wheel be rotated, as by the master wheel or in "carrying", then as long as its three-scalloped disk 242 presents its cylindrical surface beneath the pawl end 262, the latter can not move down and therefore neither can its coöperating carried pinion 25 nor the carrier wheel 24 next to the left, and engaged by said carried pinion, be rotated. But should the carrier wheel be rotated far enough to "carry",—that is, until a tooth of its three-toothed disk 243 strikes and drives its coöperating carried pinion 25 and rotates it, thus tending to force its coöperating pawl end 261 away and the pawl end 262 in toward the three-scalloped disk 242,— then at that time such tendency will not be interfered with because the scallop of the three-scalloped disk will simultaneously present itself opposite the pawl end. Fig. 1 represents the parts in such position. Upon the continuation of the rotation of the carrier wheel, the scallop passes by and the cylindrical surface again forces the pawl end 262 away and thus again locks its carried pinion 25 and its engaged carrier wheel 24 next to the left.

The above explains how the actual carrying and the locking during the carrying take place. It shows that each carrier wheel is located against overthrow. Were the mechanism intended as a counting mechanism, the parts mentioned would be sufficient. But it is intended as a totalizer, as distinguished from a counting mechanism, and it is therefore necessary to have one more function, namely, the possibility of operating any carrier wheel independently of the carrier wheel to the right, and it is therefore necessary to show how this additional function is accomplished.

Referring particularly to Fig. 2, it will be seen that the number of carried pinions is one less than the number of carrier wheels 24. The total width of a carried pinion is made equal to the width of a carrier wheel, and it is therefore evident that this leaves some room to spare upon the carried pinion shaft 15. The carried pinions can therefore be slid upon their shaft, some to the right, the rest to the left, and they are so slid by the knife edge top 101 of the master dog 10, which enters between the carried pinions and forces them apart, taking up all the spare room between them. The carried disks at the left are thus pushed into their proper positions to operate in the manner above described. Now the master dog and master wheel are so located that the master dog upon its operation forces to the right all the carried pinions to the right of it, inclusive of the one normally locking the carrier wheel which is just now engaged by the master wheel. Said carrier wheel is thus disconnected from the carrier wheels to its right and can therefore be rotated independently of them. This is the additional function above mentioned as being required to distinguish a totalizer from a counting mechanism.

The carried pinions forced to the right do not have any force exercised on them tending to turn them, but they might nevertheless be turned by the jarring and vibration in the machine. Therefore, to help keep them alined and to help eliminate lost motion, the lock plate 17 is provided. It is comb-shaped and its teeth are so shaped as to be engaged by the carried disks in the position at the right. This plate is not necessary for the operation of the machine, but is simply a convenience.

In Fig. 3 is shown a modification of the above mechanism. The three-scalloped piece 242 at the middle of the carrier wheel has had its diameter increased until it finally has become equal to that of the thirty-toothed gear 241. If left unaltered, it would have interfered with the teeth of the master wheel 8 and the carried pinions 25. In order not to interfere, it has had spaces cut in it in alinement with the spaces cut in the thirty-toothed gear and it has thus become a thirty-toothed gear with three teeth removed, namely, those opposite the three teeth of 243. The scallops upon the three-scalloped piece now assume a different shape and a corresponding change must be made upon the pawl end 262, as shown in Fig. 3. Here the end 262 normally rides upon the top of the teeth 242, being too wide to drop into the spaces thereof; but at the places where the teeth have been cut away, that is, at the places corresponding to the scallops, the space is wide enough and the pawl end 262 drops down in a manner similar to that above described.

The drawings and the above specification show a totalizer wherein the carrier wheels are mounted so as not to be separable into two groups by being moved axially while the carried intermediate pinions are capable of being so moved. Without departing from the spirit of my invention, the above construction could be reversed. The carried pinions might be mounted so as to be axially non-movable, while the carrier wheels might be moved axially in one direction to make and in the other direction to break the connection between one carrier wheel and the next higher carrier wheel.

Many of the elements and combinations shown above are old, but as far as I am aware I am the first to show a totalizer containing a set of wheels comprising a series of carrier wheels, a series of intermediate carried pinions to coöperate with them, and means for moving any or all of the wheels of the totalizer in an axial direction to thereby split the set of wheels into two groups so that the highest carrier wheel of the lower group and the lowest carrier wheel of the higher group shall be disengaged from each other.

I claim:

1. In a calculating machine, a totalizer containing a set of wheels comprising a series of carrier wheels and a series of intermediate carried pinions mounted therein,—each of said carrier wheels being adapted to drive its coöperating carried pinion, which in turn is adapted to drive the next higher carrier wheel,—and means for moving any of the wheels of the above set in its axial direction, to thereby disconnect a carrier wheel from the next higher carrier wheel.

2. In a calculating machine, a totalizer containing a set of wheels comprising a series of carrier wheels and a series of intermediate carried pinions mounted therein,— each of said carrier wheels being adapted to drive its coöperating carried pinion, which in turn is adapted to drive the next higher carrier wheel—and means for moving any of the carried pinions of the totalizer in its axial direction, to thereby disconnect a carrier wheel from the next higher carrier wheel.

3. In a calculating machine, a totalizer containing a set of wheels comprising a series of carrier wheels and a series of intermediate carried pinions mounted therein,— each of said carrier wheels being adapted to drive its coöperating carried pinion, which in turn is adapted to drive the next higher carrier wheel,—and means for moving the carried pinions axially, to thereby disconnect a carrier wheel from the next higher carrier wheel.

4. In a calculating machine, a totalizer containing a series of carrier wheels, a series of carried pinions,—each of said carrier wheels being adapted to drive its coöperating carried pinion, which in turn is adapted to drive the next higher carrier wheel,—one or more parallel shafts mounted in the totalizer and on which shafts the carried pinions are mounted, and means for moving the carried pinions on their shafts, to thereby break the connection between a carrier wheel and the next higher carrier wheel.

5. In a calculating machine, a totalizer containing a series of carrier wheels, a series of carried pinions,—each of said carrier wheels being adapted to drive its coöperating carried pinion, which in turn is adapted to drive the next higher carrier wheel,—a shaft mounted in the totalizer and on which the carried pinions are mounted, and means for moving the carried pinions on their shaft to thus separate them into two groups and to break the connection between a carrier wheel and the next higher carrier wheel.

6. In a calculating machine, a series of carrier wheels, each of said carrier wheels being adapted to carry the next higher carrier wheel; a series of intermediate pinions, each of said pinions being adapted to serve as a connection between a carrier wheel and the next higher carrier wheel; and means for moving the intermediate pinions axially to thereby separate them into two groups, the pinions in one group thus being placed in such a location that each pinion serves as a connection between a carrier wheel and the next higher carrier wheel, and the pinions in the other group thus being placed in such a location as to break the connection between the carrier wheel and the next higher carrier wheel.

7. In a calculating machine, a totalizer containing a series of carrier wheels, a series of carried pinions, and a shaft on which the carried pinions are mounted,—each carried pinion being adapted to serve as a connection between a carrier wheel and the next higher carrier wheel when in one position on the shaft, and being adapted to break such connection when in another position on the shaft,—and means for moving the carried pinions on the shaft and locating them in two groups, the carried pinions of one group being placed in the first mentioned position and the carried pinions of the other group being placed in the second mentioned position.

8. In a calculating machine, a totalizer containing a series of carrier wheels, a series of carried pinions, and a shaft on which the carried pinions are mounted,—each carried pinion being adapted to serve as a connection between a carrier wheel and the next higher carrier wheel when in one position on the shaft, and being adapted to break such connection when in another position on the shaft,—and a master dog for moving the carried pinions on the shaft and locating them in two groups, the carried pinions of one group being located in the first mentioned position and the carried pinions of the other group being located in the other position.

9. In a calculating machine, a totalizer containing a series of carrier wheels, a series of carried pinions, and a shaft on which the carried pinions are mounted,—each carried pinion being adapted to serve as a connection between a carrier wheel and the next higher carrier wheel when in one position on the shaft, and being adapted to break such connection when in another position on the shaft,—and a wedge-shaped master dog for moving the carried pinions on the shaft and locating them in two groups, the carried pinions of one group being located in the first mentioned position and the carried pinions of the other group being located in the other position.

10. In a calculating machine totalizer, a lower carrier wheel, a carried pinion, a higher carrier wheel, and a pawl,—the lower carrier wheel driving the carried pinion, and the carried pinion driving the higher carrier wheel during the process of carrying—the pawl being operated by the lower carrier wheel to lock the carried pinion against rotation, except during the period of carrying when such rotation is permitted—and means for moving the carried pinion on its shaft, to thereby disconnect it from the higher carrier wheel to thus permit the rotation of the latter independently of the rotation of the lower carrier wheel.

11. In a calculating machine totalizer, a lower carrier wheel, a carried pinion, a higher carrier wheel, and a pawl—the lower carrier wheel driving the carried pinion, and the carried pinion driving the higher carrier wheel during the process of carrying—the pawl being operated by the lower carrier wheel to lock the carried pinion against rotation, except during the period of carrying when such rotation is permitted—and a master dog for moving the carried pinion on its shaft, to thereby disconnect it from the higher carrier wheel to permit the rotation of the latter independently of the rotation of the lower carrier wheel.

12. In a calculating machine totalizer, a lower carrier wheel, a carried pinion, a higher carrier wheel, and a pawl—the lower carrier wheel driving the carried pinion, and the carried pinion driving the higher carrier wheel during the process of carrying—the pawl being operated by the lower carrier wheel to lock the carried pinion against rotation, except during the period of carrying when such rotation is permitted—and a wedge-shaped master dog operable to enter between the carried pinions to move them on their shaft, to thereby disconnect them from their higher carrier wheels.

13. In a calculating machine totalizer, a series of carrier wheels, a series of carried pinions, each carrier wheel being adapted to drive a carried pinion, which in turn is adapted to drive the next higher carrier wheel,—the wheels and pinions being relatively movable in one axial direction into one position, to thereby make the connection between them, and movable in the other axial direction into another position, to thereby break the connection between them,—and a lock-plate mounted in the totalizer and engaging the wheels and pinions and locking and alining them, while said wheels and pinions are in the position where the connection between them is broken.

14. In a calculating machine totalizer, a series of carrier wheels, a series of carried pinions, each carrier wheel being adapted to drive a carried pinion, which in turn is adapted to drive the next higher carrier wheel, a shaft on which the carried pinions are mounted, each carried pinion being movable on the shaft into one position to connect its two adjacent carrier wheels, and into another position to disconnect them, and a lock-plate mounted in the totalizer and locking and alining the carried pinions while in their disconnecting position.

In witness whereof, I have hereunto subscribed my name in the presence of two witnesses.

HYMAN ELI GOLDBERG.

Witnesses:
O. R. HURLBUT,
E. W. STOLZENBACH.